United States Patent [19]

Hüutter

[11] Patent Number: 4,936,524
[45] Date of Patent: Jun. 26, 1990

[54] RECORDING AND/OR REPRODUCING APPARATUS FOR A RECORD CARRIER IN TAPE FORM

[75] Inventor: Heinrich Hüutter, Tulln, Austria

[73] Assignee: U.S. Philips Corporation, New York, N.Y.

[21] Appl. No.: 375,065

[22] Filed: Jun. 30, 1989

[30] Foreign Application Priority Data

Jul. 5, 1988 [AT] Austria ................................ 1740/88

[51] Int. Cl.$^5$ ........................ G11B 15/32; G11B 15/44
[52] U.S. Cl. ..................................... 242/201; 74/397; 192/21; 360/96.3
[58] Field of Search .............. 242/201, 204, 205, 192; 360/96.3; 74/397, 380, 405, 406; 192/21, 48.91

[56] References Cited

FOREIGN PATENT DOCUMENTS 2440983 3/1975 Fed. Rep. of Germany ...... 242/201
2038682 12/1970 France .

Primary Examiner—Stuart S. Levy
Assistant Examiner—William G. Battista, Jr.

[57] ABSTRACT

Figure 3:
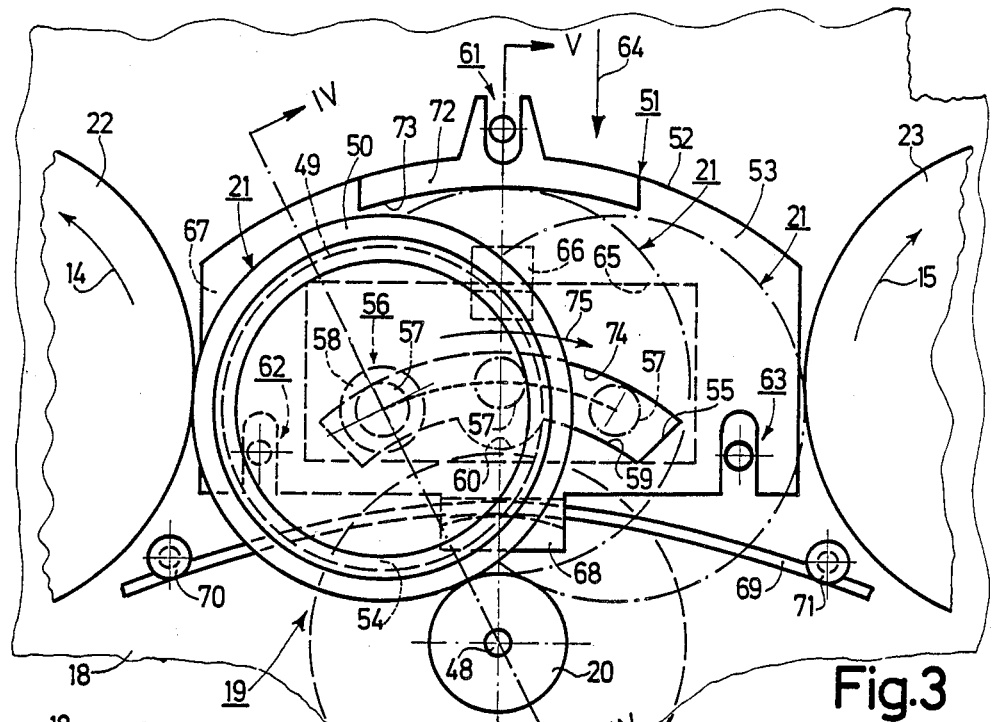

A recording and/or reproducing apparatus (1) for a record carrier (12) in tape form which extends between two hubs (10, 11) has, for driving the two hubs, two winding spindles (16, 17) which are each connected to one winding spindle wheel (22, 23). For driving the two winding spindle wheels (22, 23) peripherally, the apparatus (1) has a drive wheel (21) which can be motor-driven in opposite directions of rotation. For alternatively driving the two winding spindle wheels (22, 23) the drive wheel is displaceable between two operating positions. When its direction of rotation is changed, the drive wheel is automatically displaced from one to the other operating position, whereby for its displacement the drive wheel (21) rolls peripherally along an associated rolling surface (73) which is provided on a roller member (51). The drive wheel (21) has a cylindrical knob (57) which is coaxial to it, has a small diameter and rolls along a further rolling surface (74) provided on the roller member (51) exclusively in the region of the start and in the region of the end of the displacement of the drive wheel (21) from one to the other operating position, in these two regions the drive wheel (21) having been lifted off from the associated rolling surface (73) (FIG. 3).

8 Claims, 2 Drawing Sheets

RECORDING AND/OR REPRODUCING APPARATUS FOR A RECORD CARRIER IN TAPE FORM

The invention relates to a recording and/or reproducing apparatus for a record carrier in tape form which extends between two adjacent rotatingly drivable hubs, having two winding spindles which are provided for driving the hubs and can be driven in opposite directions of rotation, said winding spindles having two adjacent winding spindle wheels each of which is in drive connection with one of the two winding spindles and can be driven at the periphery by a drive wheel which can be motor-driven alternatively in opposite directions of rotation, for the alternative driving of the two winding spindle wheels the drive wheel is displaceable between two operating positions, and when its direction of rotation is changed, the drive wheel is automatically displaced from one to the other operating position, for its displacement the periphery of the drive wheel rolls under spring action along an associated rolling surface provided on a roller member. Such an apparatus is known from French Published Application No. 2,038,682. In this known apparatus, the roller member is formed by a thin, bent resilient plate and the periphery of the drive wheel is in frictional connection with the rolling surface on the resilient plate even in its two operating positions, in which the drive wheel is in peripheral drive connection with, in each case, one of the two winding spindle wheels for the purpose of driving the latter, and this has the consequence that, by reason of the friction effect between the drive wheel and the rolling surface, frictional losses occur in the operating positions of the drive wheel. Such frictional losses are proportional to the diameter and to the peripheral speed of the frictional region of a rotating wheel. Since, in the present case, the drive wheel is in frictional connection in its outer peripheral region with the rolling surface, i.e. in the region of the greatest diameter and thus of the greatest peripheral speed, this results in the occurrence of relatively great frictional losses in the case of the known apparatus. However, such great frictional losses are disadvantageous with respect to a minimum possible generation of heat between the friction partners, minimum possible wear of the friction partners and minimum possible power consumption of the motor during the driving of one of the two winding spindle wheels by means of the drive wheel.

It is the object of the invention to avoid the above-mentioned difficulties and to create an apparatus of the generic type presented at the outset in which only the smallest possible frictional losses occur in the two operating positions of the drive wheel. For this the invention is characterized in that the drive wheel has a coaxial projecting cylindrical knob having a smaller diameter than the diameter of the drive wheel and in that a further rolling surface is provided along which surface the knob rolls only in the region of the start and in the region of the end of the displacement of the drive wheel from one to the other operating position, in these two regions the drive wheel being lifted off from the associated rolling surface and between these two regions the knob being lifted off from the further rolling surface and the drive wheel rolls along the associated rolling surface. In this way it is achieved that, in the two operating positions of the drive wheel, it is not the drive wheel itself but only the knob connected to the drive wheel which is in frictional connection with the further rolling surface. Since, in comparison with the peripheral speed and the diameter of the drive wheel, the peripheral speed and the diameter of the knob, which two variables determine the frictional losses, are small, particularly small frictional losses in the two operating positions of the drive wheel are achieved in this way. As a result, the generation of heat between the knob and the further rolling surface is kept low, so that no measures to dissipate heat have to be taken and the further rolling surface together with the roller member and the knob together with the drive wheel can advantageously be produced from plastic, which is simple and cheap. By reason of the low frictional losses, a low wear of the friction partners and furthermore a relatively low power consumption of the motor during the driving of one of the two winding spindle wheels by means of the drive wheel is also achieved. Also advantageous here, with regard to the displacement of the drive wheel, is the fact that the rolling of the knob of small diameter along the further rolling surface results in a relatively low displacement speed for the drive wheel in the region of the start and in the region of the end of its displacement out of and into its operating positions, whereas, between these two regions, due to the rolling of the drive wheel of large diameter along the rolling surface associated with it, a relatively high displacement speed for the drive wheel in the remaining larger region of its displacement is achieved. A gentle lifting of the drive wheel from the winding spindle wheels and a gentle laying of the drive wheel against the winding spindle wheels, on the one hand, and a rapid displacement of the drive wheel between its two operating positions on the other hand is thereby ensured. The gentle laying of the drive wheel against the winding spindle wheels prevents a rebound as it is laid against the latter.

At this point it should be mentioned that German Offenlegungsschrift No. 2,440,983 discloses an apparatus in which, for driving two winding spindle wheels, a drive shaft is provided which is held so as to be pivotable between the two winding spindle wheels and is pivoted automatically between two operating positions depending on its direction of rotation, in each of which operating positions it is in peripheral drive connection with one of the two winding spindle wheels for the purpose of driving the latter, and which during its displacement rolls along a rolling surface which is provided on a block-shaped, spring-loaded roller member and with which the drive shaft is then in frictional connection in its two operating positions. In this known apparatus, the drive shaft, which has only a small diameter, serves directly for alternatively driving the two winding spindle wheels, there being only a very small transmission ratio due to the diameter ratios. Because of this small transmission ratio, the drive shaft must be driven at a high speed in order to achieve a sufficiently high speed of the winding spindle wheels, with the result, however, that it has a high peripheral speed. Because the drive shaft is in frictional connection with the rolling surface even in its two operating positions, this once again results in high frictional losses in the operating positions of the drive shaft, with the result that the advantage according to the invention, namely the achievement of small frictional losses cannot be achieved in the case of this known apparatus. Furthermore, in the case of this known apparatus, the displacement of the drive shaft from one into the other operating position takes a relatively long time because, due to its small diameter, the displacement speed of the drive shaft obtained by the rolling of the drive shaft along the rolling surface is low and only the drive shaft itself rolls along the rolling surface throughout the entire range of the displacement of the drive shaft. In contrast, as already explained above, in the apparatus according to the invention a rapid displacement of the drive wheel from one to the other operating position is achieved because a relatively high displacement speed for the drive wheel is obtained during the rolling of the drive wheel of large diameter along the rolling surface associated with it.

With regard to achieving small frictional losses it is per se expedient to keep the diameter of the knob as small as possible, in which case, however, the displacement speed of the drive wheel, brought about by the rolling along of the knob, in the region of the start and in the region of the end of its displacement is the less, the smaller the diameter of the knob. Although, on the one hand, this displacement speed should be low, in order to achieve a gentle, rebound-free laying of the drive wheel against the winding spindle wheels, it should, on the other hand, be sufficiently high to obtain a short displacement time, overall, of the drive wheel from one or the other operating position. In this connection it has proved advantageous if the ratio of the diameter of the knob to the diameter of the drive wheel is within a range between 1:5 and 1:10. In this way, a good compromise is achieved with regard to the achievement of minimum possible frictional losses in the two operating positions of the drive wheel, on the one hand, and a sufficiently high displacement speed of the drive wheel, brought about by the rolling along of the knob, in the region of the start and in the region of the end of its displacement on the other hand.

The drive wheel can, for example, be rotatably mounted on a separate pivotable lever. However, it has proved advantageous if the drive wheel is held displaceably on the roller member. In this way, it is achieved that the roller member is additionally utilized to hold the drive wheel displaceably, so that a separate component for holding the drive wheel is superfluous, this being advantageous in view of a simple and cheap design having as few components as possible.

In this connection, it has proved particularly advantageous if the roller member has a plate-shaped carrier part, on one of its plate faces rests a lateral face of the drive wheel and in which carrier part a penetrating arc-shaped slot is provided through which protrudes a shaft stub which projects from the drive wheel and is coaxial to the latter and bY means of said stub the drive wheel is held displaceably on the carrier part. In this way, it is achieved that the drive wheel is held displaceably and securely on the roller member by simple means.

It has proved particularly advantageous here if, at its free end facing away from the drive wheel, the shaft stub has an end portion whose diameter is greater than the width of the arc-shaped slot and the arc-shaped slot has in its central region a widened portion through which portion and the adjoining slot region the end portion of the shaft stub can be passed when the drive wheel is mounted on the roller member. In this way, a particularly simple and timesaving mounting of the drive wheel on the roller member is achieved.

Furthermore, it has proved advantageous here if the portion of the shaft stub which is immediately adjacent to the drive wheel forms the knob of the drive wheel and that a boundary wall of the arc-shaped slot in the carrier part forms the further rolling surface for the knob. A particularly simple design is thereby achieved which is further distinguished by a particularly flat and space-saving construction.

The roller member can be arranged fixed in the apparatus, and the drive wheel held displaceably on the roller member can be pressed against the rolling surfaces by means of a driving wheel which is held displaceably in the apparatus and presses resiliently against the peripheral face of the drive wheel. However, it has proved advantageous if the roller member is displaceable in the apparatus and the roller member is engaged with a spring which presses the displaceable drive wheel on the roller member against a fixed driving wheel arranged in the apparatus. In this waY, a simple and robust design is achieved in which, by reason of the fixed arrangement of the driving wheel, the transmission of power to the winding spindle wheels is effected via only a single displaceable wheel, namely the drive wheel, this being advantageous with regard to uniform and reliable driving of the winding spindle wheels.

With regard to the design of the spring engaging on the displaceably held roller member it has proved particularly advantageous if the spring is designed as a bar spring which by its central portion engages with the displaceable roller member and is supported by each of its two end portions on a fixed pin. A particularly simple and cheap design is thereby achieved which is also advantageous with regard to easy assembly.

Figure 1:
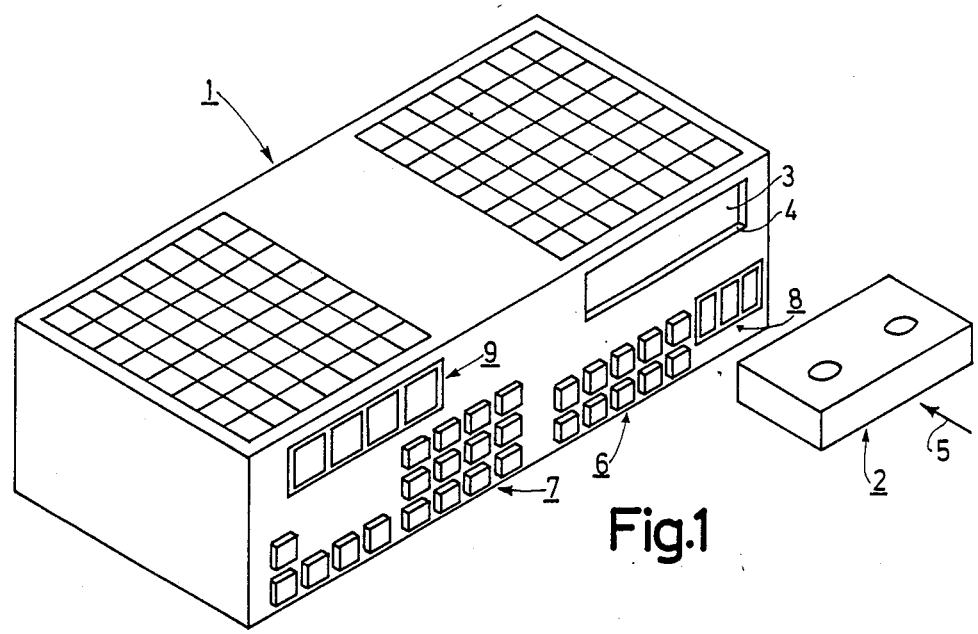
Figure 2:
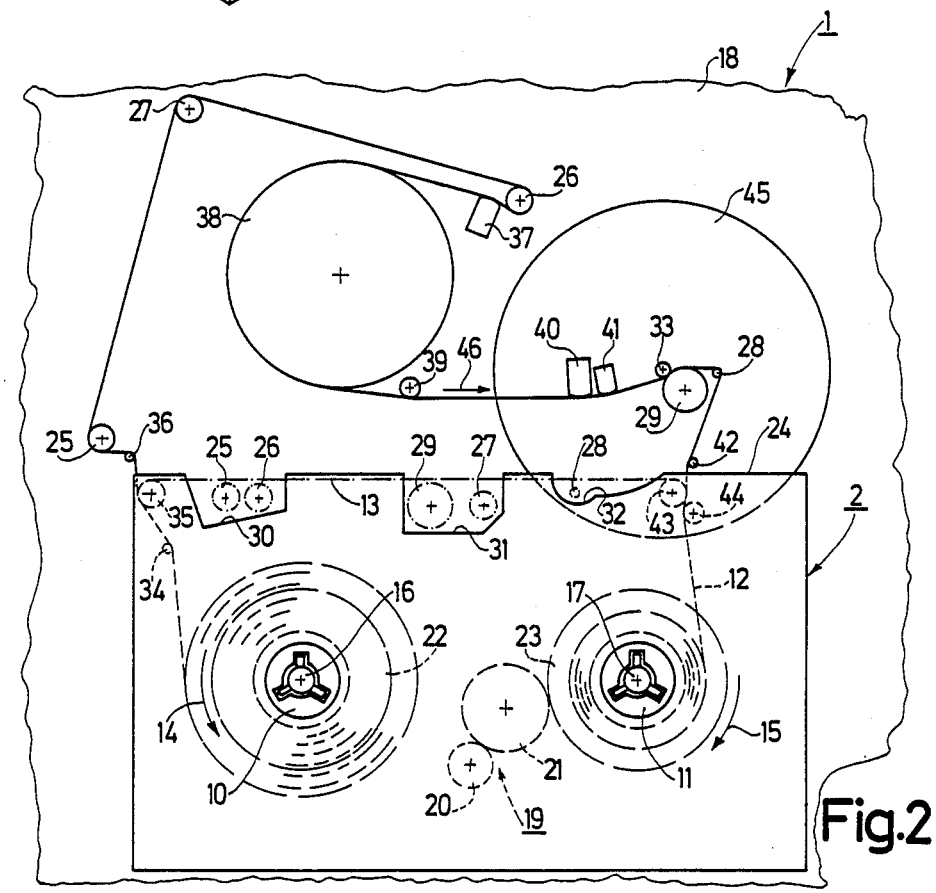
Figure 5:
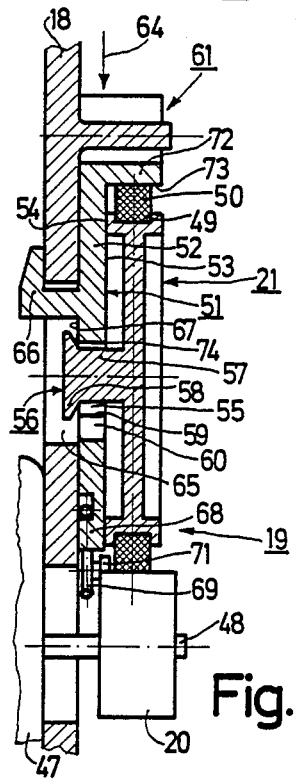
Figure 4:
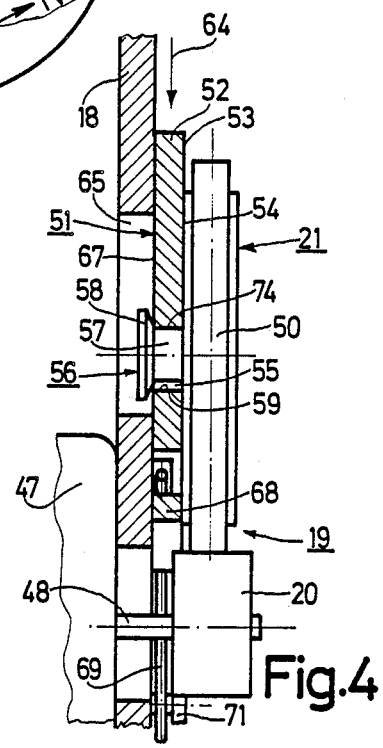

The invention is described in greater detail below with reference to an exemplary embodiment illustrated in the drawings, although there is no intention to restrict the invention to said exemplary embodiment. FIG. 1 shows diagrammatically on a reduced scale and in an oblique view a recording and reproducing apparatus for television signals and audio signals into which can be inserted a cassette which contains a magnetizable record carrier in the form of a tape, which extends between two adjacent hubs and on which television signals can be recorded in helical tracks and reproduced from said record carrier by means of rotatingly drivable magnetic heads. FIG. 2 shows diagrammatically a part of the apparatus according to FIG. 1 on a larger scale than in FIG. 1, a cassette having been inserted into the apparatus and the record carrier having been pulled out of the cassette and guided round guide and scanning elements in the apparatus. FIG. 3 shows, at approximately twice actual size and in plan view, a drive mechanism of the apparatus according to FIG. 1 for two winding spindles which serve to drive the two hubs situated adjacent to one another in the cassette and which are each connected coaxially to a winding spindle wheel, which drive mechanism has a drive wheel, displaceable between two operating positions, for alternatively driving the two winding spindle wheels. FIG. 4 shows, in a section along the line IV—IV in FIG. 3, the drive mechanism according to FIG. 3, the drive wheel occupying one of its two operating positions. FIG. 5 shows, in a section along the line V—V in FIG. 3, the drive mechanism according to FIG. 3, the drive wheel occupying an intermediate position between the two operating positions.

FIG. 1 shows a recording and reproducing apparatus 1 which is designed for recording and reproducing television signals and audio signals on a magnetizable record carrier in tape form, referred to below for short as magnetic tape. The magnetic tape is accommodated in a cassette 2 which is illustrated diagrammatically in FIG. 1 and contains two adjacent hubs between which the magnetic tape extends along a path determined by means of tape guides of the cassette. The cassette 2 can be inserted into the apparatus 1 by hand, in the direction of the arrow 5, through an opening 4 which can be closed by an inwardly displaceable cover 3. As the cassette 2 is inserted into the apparatus 1, it is pushed into a displaceable cassette holder by means of which the cassette, after being inserted fully into the apparatus, is lowered within the apparatus essentially perpendicularly to the cassette main walls into an operating position illustrated diagrammatically in FIG. 2. For switching on operating modes of the apparatus, such as "record", "playback, normal forward running", "freeze frame", "reverse playback, normal running", "fast forward", "fast rewind" and the like, the apparatus 1 has a first set 6 of operating buttons. For programming the apparatus and for inputting further data, for example for setting a clock, the apparatus 1 has a second set 7 of operating buttons. The apparatus 1 furthermore has two display units 8 and 9 whose display elements are each made up, for example, of seven segments and serve, for example, to display counter readings of a counter for measuring the tape used and for displaying times of day.

As already mentioned, a cassette 2 inserted into the apparatus 1 is lowered into an operating position. As indicated diagrammatically in FIG. 2, in the cassette 2 are accommodated two adjacent, rotatingly drivable hubs 10 and 11, between which the magnetic tape 12 within the cassette 2 extends along the path partially indicated by a chain-dotted line 13 and onto which the magnetic tape can be wound alternatively and in opposite winding direction, as indicated by the arrows 14 and 15, in accordance with its direction of movement in the particular case. As a cassette 2 is lowered into its operating position, two winding spindles 16 and 17 enter into drive connection with the hubs 10 and 11 accommodated in the cassette, which winding spindles are rotatably mounted in a mounting plate 18 of the apparatus 1. By means of the winding spindles 16 and 17 the two hubs 10 and 11 placed coaxially onto the latter can be driven rotatingly. Of course, the winding spindles may also be of a different design to that illustrated and each have, for example, a centrally arranged positioning spindle for positioning a hub and a drive spindle, arranged eccentrically to the latter, for driving a hub. A drive mechanism 19, which is indicated only in schematic form in FIG. 2, is provided for driving the two winding spindles 16 and 17 in the opposite directions 14 and 15 of rotation, said drive mechanism having a motordrivable driving wheel 20 arranged fixed in the apparatus 1 and a drive wheel 21 which can be driven by said driving wheel, is held so as to be displaceable parallel to the mounting plate 18 and can be brought peripherally into drive connection, as described in detail further below, alternatively with one of two winding spindle wheels 22 and 23 arranged coaxially to the winding spindles 16 and 17, connected fixedly to them in terms of rotation and situated at the same axial level.

As the cassette 2 is lowered into its operating position, a cassette closure cover, not illustrated, provided on its front side 24 is opened, thereby freeing a cassette opening in the front side 24 through which the magnetic tape 12 accommodated in the cassette can be guided out of the latter, and four tape guides 25, 26, 27 and 28 and a pinch roller 29, the tape guides and the pinch roller each being in a rest position illustrated in FIG. 2 by chain-dotted lines, enter three recesses 30, 31 and 32 in the cassette 2, reaching behind the magnetic tape 12 in the region of the path illustrated by the chain-dotted line 13. Once the cassette has been lowered into its operating position, the tape guides 25, 26, 27 and 28 can each be displaced into their operating position, illustrated by solid lines in FIG. 2, the pinch roller 29 too being displaceable, into an intermediate position, not illustrated in FIG. 2, in the immediate vicinity of a capstan 33. During this procedure, the magnetic tape 12 is guided out of the cassette 2 through the cassette opening in the front face 24 of the cassette. From the abovementioned intermediate position, the pinch roller 29 ca be displaced into its operating position, illustrated by a solid line in FIG. 2, in which it presses the magnetic tape 12 against the capstan 33. Since the mechanisms for opening the cassette closure cover, for displacing the tape guides and the pinch roller and for pressing the pinch roller against the capstan are not essential to the invention, they are, for the sake of simplicity, not illustrated. Such mechanisms are known from existing apparatuses of this type.

Following a displacement of the tape guides 25, 26, 27 and 28 and of the pinch roller 29 into their operating positions, the magnetic tape 12 assumes the path illustrated in FIG. 2 by a solid line. In this arrangement, the magnetic tape extends from the hub 10, via two tape guides 34 and 35 contained in the cassette 2, a tape tension feeler pin 36, which is part of a tapetension regulating mechanism (not illustrated), the displaceable tape guides 25, 27 and 26, a fixed magnetic head 37 for erasing all signals recorded on the magnetic tape 12, a drum-shaped scanning unit 38 which contains rotatingly drivable magnetic heads for recording and reproducing television signals in and from adjacent video tracks running obliquely to the longitudinal direction of the magnetic tape, a fixed tape guide 39, a fixed magnetic head 40 for erasing audio signals which have been recorded in an audio track running in the longitudinal direction of the magnetic tape 12, a further fixed magnetic head 41 for recording and reproducing audio signals in the audio track and for recording and reproducing synchronization signals in and from a control track running in the longitudinal direction of the magnetic tape and parallel next to the audio track, the capstan 33 against which the magnetic tape 12 is pressed by the pinch roller 29, the displaceable tape guide 28, a fixed tape guide 42 and two further tape guides 43 and 44 contained in the cassette 2, to hub 11.

The capstan 33, which is customarily connected to a disc flywheel 45, can be driven alternatively in one of two directions of rotation at a constant speed. In this way, with the pinch roller 29 pressed against the capstan 33, the magnetic tape 12 can be driven alternatively in one of two mutually opposite directions of movement at a constant speed of movement. When the capstan 33 is driven in accordance with FIG. 2 at a predetermined speed anticlockwise, the magnetic tape 12 is driven in the direction of the arrow 46, which corresponds to so-called "normal forward running", in which the recording of signals in the "record" operating mode and also the normal playback of the latter in the operating mode "playback, normal forward running" takes place and in which, for the purpose of winding the magnetic tape 12 onto the hub 11, the winding spindle wheel 23 connected fixedly in terms of rotation to the winding spindle 17 is driven in the direction of the arrow 15 by the drive wheel 21 of the drive mechanism 19. If the capstan 33 is driven at the same predetermined speed, but, in accordance with FIG. 2, in the clockwise direction, the magnetic tape 12 is driven in the opposite direction to the arrow 46, thus corresponding to so-called "normal reverse running", which is also referred to as "reverse travel", in which, in the operating mode "playback, normal reverse running", playback of recorded television signals occurs to produce reverse movement sequences and in which, for the purpose of winding the magnetic tape 12 onto the hub 10, the winding spindle wheel 22 connected fixedly in terms of rotation to the winding spindle 16 is driven in the direction of the arrow 14 by the drive wheel 21 of the drive mechanism 19.

As already mentioned, it is also possible to switch on the operating modes "fast forward" and "fast rewind" in the apparatus 1, in which modes the magnetic tape 12 is wound at an increased speed of movement between the hubs 10 and 11. In the present apparatus, the magnetic tape 12 is guided back into the cassette 2 prior to such a winding operation by displacing the displaceable tape guides 25, 26, 27 and 28 and the pinch roller 29 from their operating positions back into their rest positions, illustrated by chain-dotted lines in FIG. 2, and by simultaneously driving the winding spindle 16 in the direction of the arrow 14 with the aid of the drive wheel 21 of the drive mechanism 19, the magnetic tape 12 then running once more along the path indicated by the chain-dotted line 13. During winding of the magnetic tape 12 in the operating modes "fast forward" and "fast rewind", the magnetic tape 12 is driven exclusively by driving one of the two hubs 10 and 11, the two winding spindles 16 and 17 being drivable by the drive mechanism 19 in these two operating modes as well, the drive wheel 21 of said drive mechanism being brought into peripheral drive connection with the winding spindle wheel 23 in the operating mode "fast forward" and with the winding spindle wheel 22 in the operating mode "fast rewind".

The drive mechanism 19 of the apparatus 1 by means of which the two winding spindle wheels 22 and 23, which are only partially illustrated in FIG. 3, can be driven peripherally, is described in detail below with reference to FIGS. 3, 4 and 5. The drive mechanism 19 has a motor 47 which is attached to the mounting plate 18 and can be driven in opposite directions of rotation. It should be mentioned that the motor 47 is connected to a controllable supply circuit which is not illustrated since it is not essential to the invention and which supplies the motor with various supply voltages and currents depending on the operating mode selected in the apparatus, so that the motor is driven in a controlled manner in different directions of rotation and at different speeds depending on the operating mode. During the winding of the magnetic tape, the motor 47 is driven at considerably higher speed than when driving the magnetic tape at normal tape speed.

On its motor shaft 48, the motor 47 carries the driving wheel 20, which in this way is arranged fixed in the apparatus. The driving wheel 20 is designed as a frictional wheel. The drive wheel 21, which is likewise designed as a frictional wheel and is composed of plastic, is held peripherally in drive connection with the driving wheel 20, further details of this being given below, so that in this way the drive wheel 21 can be motor-driven in opposite directions of rotation via the driving wheel 20 in accordance with the direction of rotation of the motor 47. On its peripheral region, the drive wheel 21 has a groove 49 into which is inserted a rubber ring 50 by means of which a sufficiently high friction required for satisfactory functioning is guaranteed. For alternatively driving the two winding spindle wheels 22 and 23, the drive wheel 21 is held so as to be displaceable between two operating positions, in which the drive wheel is in each case peripherally in drive connection with one of the two winding spindle wheels 22 and 23, the rubber ring 50 resting against the peripheral face of the relevant winding spindle wheel. In FIG. 3, in that operating position in which the drive wheel 21 rests peripherally against the winding spindle wheel 22, the drive wheel 21 is illustrated in solid lines and in that operating position in which it rests on the other winding spindle wheel 23, it is only indicated by a chain-dotted line.

The drive wheel 21 is held displaceably on a roller member 51 composed of plastic. In this arrangement, the roller member 51 has a plate-shaped carrier part 52, on one of whose plate faces, the plate face 53 facing away from the mounting plate 18, the drive wheel 21 rests by an annular lateral face 54 of the latter, so that, when the drive wheel 21 is displaced, the lateral face 54 slides on the plate face 53. In the region of the plate face 53, grooves can also be provided in the plate-shaped carrier part in order to reduce the frictional resistance. In the plate-shaped carrier part 52 there is provided a circular arc-shaped slot 55 which penetrates it and the center of whose circular arc is offset somewhat relative to the axis of the driving wheel 20 in a direction towards the slot. Through the slot 55 there protrudes a shaft stub 56 which projects from the drive wheel 21, is coaxial to the latter and by means of which the drive wheel 21 is held displaceably on the plate-shaped carrier part 52 and hence on the roller member 51. For this purpose, the shaft stub 56 has a first portion 57 which adjoins the drive wheel 21, the diameter of which is smaller than the width of the slot 55 and which passes through the plate-shaped carrier part 52, and an end portion 58 which adjoins the first portion 57, the diameter of which is greater than the width of the slot 55 and which reaches behind the plate-shaped carrier part 52 and in this way holds the drive wheel 21 displaceably on the roller member 51. The first portion 57 of the shaft stub 56 forms a cylindrical knob which projects from the drive wheel 21, is coaxial to the latter, has a smaller diameter than the diameter of the drive wheel 21 and fulfills a further function which will be explained in greater detail below. In the present case, the diameter of the first portion 57 and the diameter of the drive wheel 21 in the region of the peripheral face of the rubber ring 50 have a ratio of about 1:7. In its central region, in the course of its boundary wall 59 facing the driving wheel 20, the slot 55 has a widened portion 60, the size of which is selected such that the end portion 58 of the shaft stub 56 can be passed easily through the widened portion 60 and the slot region adjoining the latter when the drive wheel 21 is mounted on the roller member 51, so that in this way the drive wheel 21 can be mounted on the roller member 51 in a particularly simple and time-saving manner.

The roller member 51 is guided on the mounting plate 18 with the aid of three pin-slot connections 61, 62 and 63 so as to be displaceable in the direction of the arrow 64 and held displaceably on the mounting plate with the aid of a hook 66 which projects from its carrier part 52, is passed through an opening 65 in the mounting plate 18 and reaches behind the mounting plate 18, the carrier part 52 sliding on the mounting plate 18 by its plate face 67 facing the mounting plate 18 in the case of a displacement of the roller member 51. A bar spring 69 which is supported by each of its end portions on one of two pins 70 and 71 protruding from the mounting plate 18 and which loads the roller member 51 in the direction of the arrow 64 engages by its central portion on an anglepiece 68 of the roller member 51, said angle-piece projecting in the direction of the arrow 64 from the carrier part 52.

From the plate-shaped carrier part 52 of the roller member 51 there projects a strip 72 which has a circular arc-shaped boundary wall 73 which faces the drive wheel 21 and the center of whose circular arc virtually coincides with the axis of the driving wheel 20. The boundary wall 73 forms a rolling surface which is associated with the drive wheel 21 and along which the drive wheel 21 rolls by its periphery, i.e. by its rubber ring 50, under spring action in the course of its displacement between its two operating positions, the spring action being provided by the bar spring 69. In addition, the roller member 51 also has a further rolling surface 74, which, in the present case, is formed by a circular arc-shaped boundary wall of the slot 55, which boundary wall faces away from the driving wheel 20. This further rolling surface 74 is provided for interacting with the first portion 57 of the shaft stub 56. The arrangement and the design of the two rolling surfaces 73 and 74 is here such that the first portion 57 of the shaft stub 56 rests against the further rolling surface 74 in the two operating positions of the drive wheel 21, the rubber ring 50 of the drive wheel 21 having been lifted off from the rolling surface 73 associated with it and hence being out of connection with the rolling surface 73 associated with it, and that the first portion 57 of the shaft stub 56 rolls along the further rolling surface 74 exclusively in the region of the start and in the region of the end of the displacement of the drive wheel 21 from one to the other operating position, in these two regions the rubber ring 50 of the drive wheel 21 also having been lifted off from the rolling surface 73 associated with it, and that furthermore, between these two regions, during the remaining displacement of the drive wheel 21 from one to the other operating position, the rubber ring 50 of the drive wheel 21 rolls along the rolling surface 73 associated with it and during this the first portion 57 of the shaft stub 56 has been lifted off from the further rolling surface 74. When the direction of rotation of the drive wheel 21 is changed, the latter is automatically displaced from one to the other operating position with the aid of the two rolling surfaces 73 and 74. As mentioned, the roller member 51 is engaged by the bar spring 69 which in the process, via the rolling surfaces 73 and 74 provided on the roller member 51, presses the drive wheel 21 held displaceably on the roller member peripherally against the driving wheel 20 arranged fixed in the apparatus and in this way maintains the peripheral drive connection between the driving wheel 20 and the drive wheel 21, so that, during its displacement from one to the other operating position, the drive wheel 21 is displaced along a circular arc coaxial to the axis of the driving wheel 20. In the two operating positions of the drive wheel 21, the bar spring 69 ensures that the drive wheel 21 remains at all times securely in drive connection both with the driving wheel 20 and with the relevant winding spindle wheel 22 or 23, for which purpose the bar spring 69 should, on the one hand, have a certain spring force. On the other hand, however, this spring force should not be greater than is necessary in the abovementioned context because this spring force has a direct effect on the frictional losses arising due to the rolling of the first portion 57 of the shaft stub 56 along the further rolling surface 74 in the two operating positions of the drive wheel 21.

The way in which the drive mechanism 19 functions is described below, it being assumed that the drive wheel 21 is in that operating position in which it rests peripherally against the winding spindle wheel 22, as illustrated in FIG. 3 by solid lines. When the drive wheel 21 is in this operating position, the first portion 57 of the shaft stub 56 rests against the further rolling surface 74, the rubber ring 50 of the drive wheel 21 having been lifted off from the rolling surface 73 associated with it and thus being out of connection with the rolling surface 73. If, in accordance with FIG. 3, the drive wheel 21 is now driven in the anticlockwise direction by the motor 47 via the driving wheel 20, the first portion 57 of the shaft stub 56 first of all rolls along the further rolling surface 74, this resulting in a displacement of the drive wheel 21 in the direction of the arrow 75, this displacement taking place at a relatively low displacement speed due to the small diameter of the first portion 57 of the shaft stub 56. During this procedure, the rubber ring 50 of the drive wheel 21 is still out of connection with the rolling surface 73. After a displacement of the drive wheel 21 in an angular range of about 7° with respect to the axis of the driving wheel 20, the rubber ring 50 of the drive wheel 21 then comes into connection with the rolling surface 73, the roller member 51 being displaced a little counter to the force of the bar spring 69 in a direction opposite to the arrow 64 by the drive wheel 21 via the rolling surface 73. In practice, this displacement amounts to only a few tenths of a millimeter. Due to this displacement of the roller member 51, the further rolling surface 74 is lifted off from the first portion 57 of the shaft stub 56, with the result that the frictional connection between the first portion 57 of the shaft stub 56 and the further rolling surface 74 is released. From then on, the drive wheel 21 rolls along the rolling surface 73 by means of the rubber ring 50. This situation is indicated in FIG. 3 by a chain-dotted line and illustrated in FIG. 5, the drive wheel 21 being in a central position between its two operating positions. Because of the large diameter of the rubber ring which is now effective, the rolling of the rubber ring 50 along the rolling surface 73 results in a rapid displacement movement of the drive wheel 21 in the direction of the arrow 75. As soon as the rubber ring 50 has reached the end of the rolling surface 73, it lifts off from the rolling surface 73 and hence moves out of connection with the rolling surface 73, the bar spring 69 then displacing the roller member 51 back in the direction of the arrow 64 until the further rolling surface 74 comes back into connection with the first portion 57 of the shaft stub 56. After this, the first portion 57 of the shaft stub 56 once more rolls along the further rolling surface 74, this resulting once again in a slow displacement of the drive wheel in the direction of the arrow 75. It is thereby achieved that, in the region of the end of its displacement, the drive wheel 21 approaches the winding spindle wheel 23 at relatively low speed, with the result that rebounding when the drive wheel 21 is laid against the winding spindle wheel 23 by its rubber ring 50 is prevented. Thus, in the operating position of the drive wheel 21 which has now been reached, which is indicated by a chain-dotted line in FIG. 3 and in which said wheel is driven by the motor 47 in the anticlockwise direction in accordance with FIG. 3 in order to drive the winding spindle wheel 23 in the clockwise direction, only the first portion 57 of the shaft stub 56 is in connection with the further rolling surface 74 whereas the rubber ring 50 of the drive wheel 21 is not in connection with the rolling surface 73. Since the diameter of the drive wheel 21 is relatively large, a large transmission ratio between the drive wheel 21 and the winding spindle wheel 23 is achieved, so that a relatively low speed of the drive wheel 21 is sufficient in order to drive the winding spindle wheel 23 at a sufficiently high speed. Since the diameter of the first portion 57 of the shaft stub 56 and, by reason of the, as mentioned, relatively low speed of the drive wheel 21 also the peripheral speed of the first portion 57 of the shaft stub 56 are small, only small frictional losses occur in the operating position of the drive wheel 21, low warming and low wear of the first portion 57 of the shaft stub 56 and of the further rolling surface 74 and a relatively low power consumption of the motor 47 during the driving of the winding spindle wheel 23 by means of the drive wheel 21 thereby being achieved. Since only a small amount of heat is generated, the friction partners can be composed of plastic, as is advantageously the case with the present apparatus too. By reason of the fact that the diameter of the first portion 57 of the shaft stub 56 is about a seventh of the diameter of the drive wheel 21, a low displacement speed of the drive wheel in the region of the end of its displacement is achieved, which low speed is favorable in respect of the avoidance of rebound processes but, on the other hand, is still sufficiently high with regard to the achievement of a low overall displacement time of the drive wheel from one to the other operating position.

The invention is not restricted to the exemplary embodiment described above. Thus, the drive wheel can also be designed as a gear in order to drive winding spindle wheels designed as gears. Instead of utilizing the first portion of the shaft stub for the purpose of rolling along the further rolling surface, the drive wheel can also have a separate coaxial knob for interaction with a further rolling surface. In its central section, in which it does not interact with the coaxial knob, the further rolling surface can have virtually any desired profile. The further rolling surface can also be formed by two part surfaces each situated in the region of the operating positions of the drive wheel. Instead of an end portion connected integrally to the shaft stub, it is also possible for a retaining ring for holding the drive wheel displaceably on the roller member to be provided, which ring can be pressed onto a cylindrical shaft stub after the latter has been passed through the arc-shaped slot, in which case the arc-shaped slot does not need to have a widened portion. The winding spindle wheels do not have to be arranged coaxially to the winding spindles and connected fixedly in terms of rotation to the winding spindles as in the exemplary embodiment described. It is also possible for slipping clutches to be provided between the winding spindles and the winding spindle wheels. It is also possible for the winding spindle wheels to be arranged laterally offset relative to the winding spindles, transversely to the directions of the axes of the latter, and to interact peripherally with intermediate wheels coaxial to the winding spindles.

I claim:

1. Recording and/or reproducing apparatus for a record carrier in tape form which extends between two adjacent rotatingly drivable hubs, having two winding spindles which are provided for driving the hubs and can be driven in opposite directions of rotation, said winding spindles having two adjacent winding spindle wheels each of which is in drive connection with one of the two winding spindles and can be driven at the periphery by a drive wheel which can be motor-driven alternatively in opposite directions of rotation, for the alternative driving of the two winding spindle wheels the drive wheel is displaceable between two operating positions, and when its direction of rotation is changed, the drive wheel is automatically displaced from one to the other operating position, for its displacement the periphery of the drive wheel rolls under spring action along an associated rolling surface provided on a roller member, characterized in that the drive wheel has a coaxial projecting cylindrical knob having a smaller diameter than the diameter of the drive wheel and in that a further rolling surface is provided along which surface the knob rolls only in the region of the start and in the region of the end of the displacement of the drive wheel from one to the other operating position, in these two regions the drive wheel being lifted off from the associated rolling surface and between these two regions the knob being lifted off from the further rolling surface and the drive wheel rolls along the associated rolling surface.

2. Apparatus according to claim 1, characterized in that the ratio of the diameter of the knob to the diameter of the drive wheel is within a range between 1:5 and 1:10.

3. Apparatus according to claim 1 or 2, characterized in that the drive wheel is held displaceably on the roller member.

4. Apparatus according to claim 3, characterized in that the roller member has a plate-shaped carrier part, on one of its plate faces rests a lateral face of the drive wheel and in which carrier part a penetrating arc-shaped slot is provided through which protrudes a shaft stub which projects from the drive wheel and is coaxial to the latter and by means of said stub the drive wheel is held displaceably on the carrier part.

5. Apparatus according to claim 4, characterized in that at its free end facing away from the drive wheel, the shaft stub has an end portion whose diameter is greater than the width of the arc-shaped slot and in that the arc-shaped slot has in its central region a widened portion through which portion and the adjoining slot region the end portion of the shaft stub can be passed when the drive wheel is mounted on the roller member.

6. Apparatus according to claim 4, characterized in that the portion of the shaft stub which is immediately adjacent to the drive wheel forms the knob of the drive wheel and that a boundary wall of the arc-shaped slot in the carrier part forms the further rolling surface for the knob.

7. Apparatus according to claim 3, characterized in that the roller member is displaceable in the apparatus and in that the roller member is engaged with a spring which presses the displaceable drive wheel with its periphery on the roller member against a fixed driving wheel arranged in the apparatus.

8. Apparatus according to claim 7, characterized in that the spring is designed as a bar spring which by its central portion engages with the displaceable roller member and is supported by each of its two end portions on a fixed pin.

* * * * *